US012762416B2

(12) United States Patent
Gupta et al.

(10) Patent No.: US 12,762,416 B2
(45) Date of Patent: Oct. 13, 2026

(54) MODEL EDITING OF A TABULAR SEARCH LARGE LANGUAGE MODEL USING DISAGREEMENT OVER OUT OF DISTRIBUTION SAMPLES VIA TRANSDUCTIVE LEARNING AND CONTEXTUAL BANDITS

(71) Applicant: Dell Products L.P., Round Rock, TX (US)

(72) Inventors: Srishti Gupta, Delhi (IN); Kuruba Ajay Kumar, Anantapur (IN); Sailendu Patra, Bangalore (IN); Saurabh Jha, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/631,859

(22) Filed: Apr. 10, 2024

(65) Prior Publication Data

US 2025/0322241 A1 Oct. 16, 2025

(51) Int. Cl.
*G06N 3/0895* (2023.01)
*G06F 16/242* (2019.01)
*G06F 16/2453* (2019.01)

(52) U.S. Cl.
CPC ......... *G06N 3/0895* (2023.01); *G06F 16/243* (2019.01); *G06F 16/24534* (2019.01)

(58) Field of Classification Search
CPC ............ G06F 16/243; G06F 16/24534; G06N 3/0895
See application file for complete search history.

(56) References Cited

U.S. PATENT DOCUMENTS 11,200,265 B2 * 12/2021 Tata .................... G06F 16/3344
12,067,347 B2 * 8/2024 Tan ........................ G06F 40/289
12,547,616 B2 * 2/2026 Thai .................. G06F 16/24522
(Continued)

OTHER PUBLICATIONS

Sui et al., "Table Meets LLM: Can Large Language Models Understand Structured Table Data? A Benchmark and Empirical Study", Mar. 4, 2024, WSDM '24: Proceedings of the 17th ACM International Conference on Web Search and Data Mining pp. 645-654 (Year: 2024).*
(Continued)

*Primary Examiner* — Boris Gorney
*Assistant Examiner* — Robert F May
(74) *Attorney, Agent, or Firm* — Chamberlain, Hrdlicka, White, Williams & Aughtry; Aly Z. Dossa

(57) ABSTRACT

A method for updating a tabular search large language model (LLM) includes performing data pre-processing on new data associated with the tabular dataset to obtain a set of sequences, applying a first fine-tuning operation on the tabular search LLM using the set of sequences, applying a second fine-tuning operation on the tabular search LLM using training data to obtain a set of final loss results and a set of updatable gradients, wherein the training data comprises at least the set of sentence predictions, applying an optimization function on the set of final loss results and the set of updatable gradients to obtain optimized gradient descent parameters, and applying the updated tabular search LLM to a new input associated with the new data to produce a new output.

16 Claims, 6 Drawing Sheets

(56) References Cited

U.S. PATENT DOCUMENTS

| | | | | |
|---|---|---|---|---|
| 2014/0108305 | A1* | 4/2014 | Gulwani | G06F 40/151 706/45 |
| 2018/0060306 | A1* | 3/2018 | Starostin | G06F 40/30 |
| 2022/0101052 | A1* | 3/2022 | Canim | G06F 17/18 |
| 2023/0419110 | A1* | 12/2023 | Ramezani | G06F 40/30 |
| 2024/0143584 | A1* | 5/2024 | Birru | G06F 16/243 |
| 2024/0203598 | A1* | 6/2024 | Neumann | G16B 40/00 |
| 2024/0274286 | A1* | 8/2024 | Chen | G16H 50/70 |
| 2024/0281472 | A1* | 8/2024 | LaRhette | G06F 16/248 |
| 2024/0354584 | A1* | 10/2024 | Mukherjee | G06F 18/2415 |
| 2024/0386215 | A1* | 11/2024 | Eisenschlos | G06F 40/40 |
| 2025/0196347 | A1* | 6/2025 | Riedmiller | B25J 9/1661 |

OTHER PUBLICATIONS

Rabbani et al., "Transfer Learning of Tabular Data by Finetuning Large Language Models", Dec. 18-20, 2024, 13th International Conference on Electrical and Computer Engineering (ICECE) (Year: 2024).*

* cited by examiner

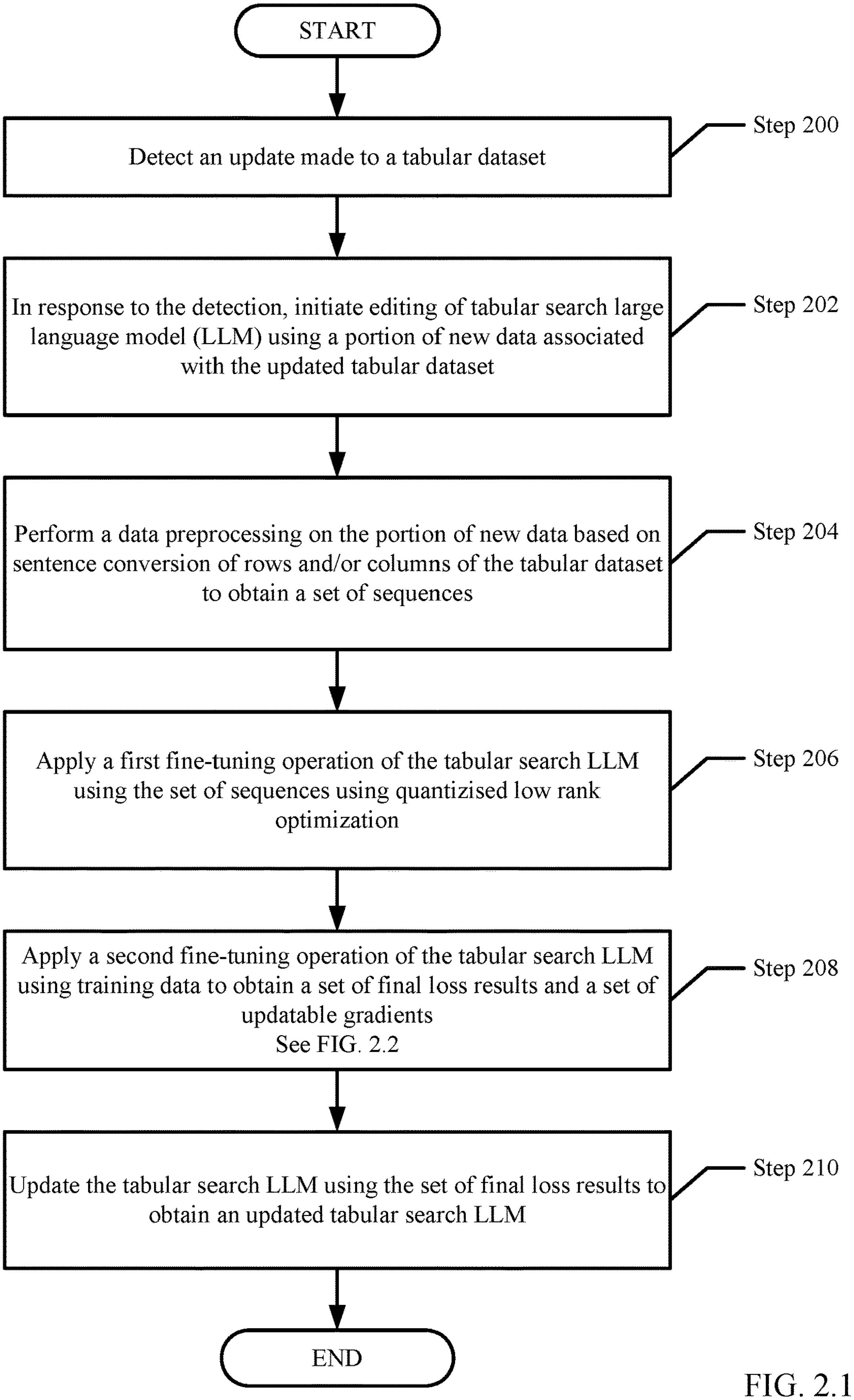
FIG. 2.1

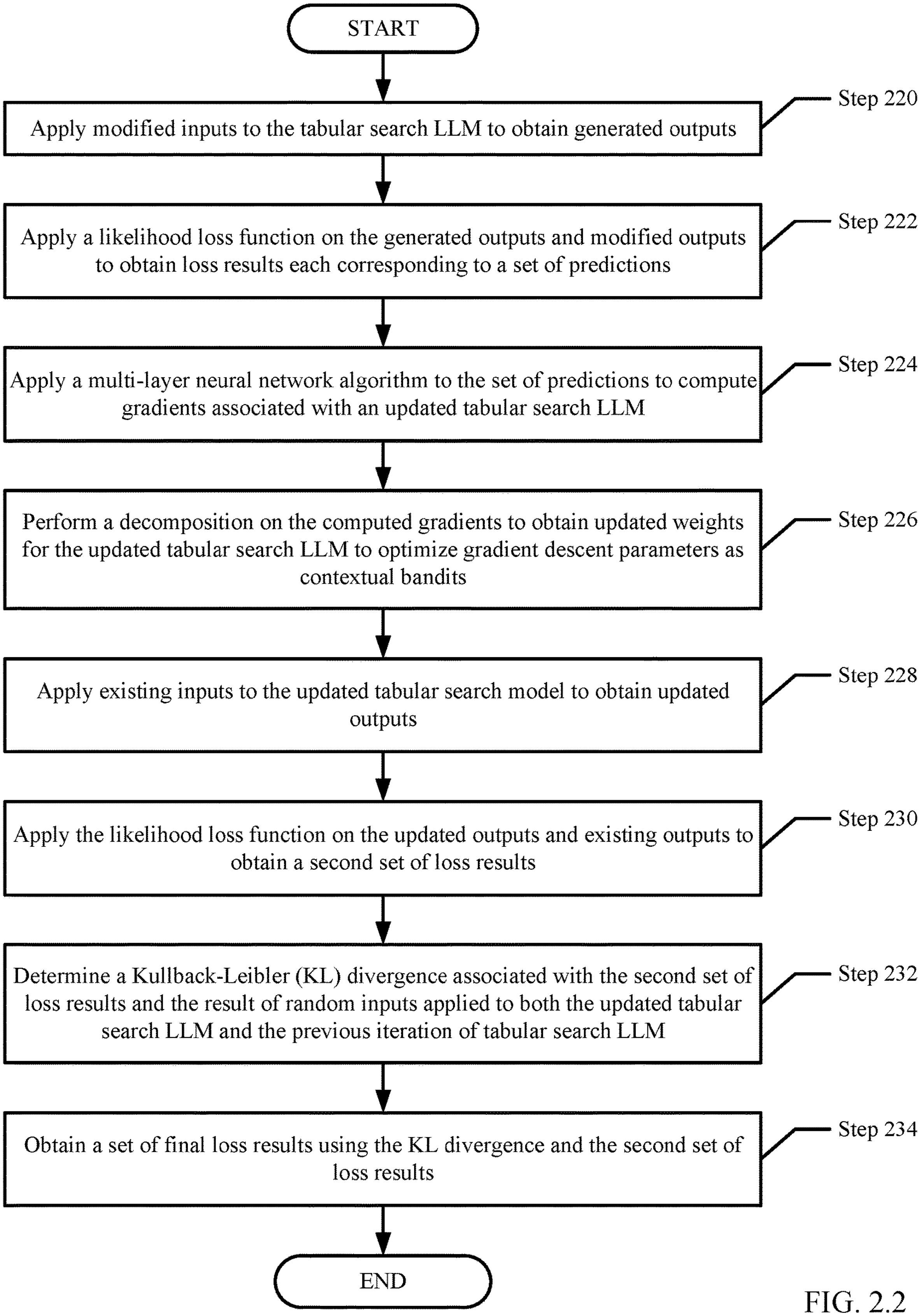
FIG. 2.2

Tabular Dataset 300
| Business_unit_ID | final_cust_nbr | Level_flg | Pd_sum | Inv_cnt | ADL | Pd_cnt | Pd_grp |
|---|---|---|---|---|---|---|---|
| 11 | 3075479032 | Affinity | 290.08 | 5 | -5.5 | 3 | High |
| 11 | 2682095398 | Affinity | 21.99 | 6 | -4.833333 | 1 | Medium |
| 11 | 37442469 | Parent_party | 84.79 | 5 | -10.75 | 1 | Medium |
| 11 | 375312852 | Parent_party | 0 | 5 | 0 | 0 | Low |
| 11 | 2704002641 | Affinity | 338.13 | 5 | 36.4 | 5 | High |
FIG. 3.1
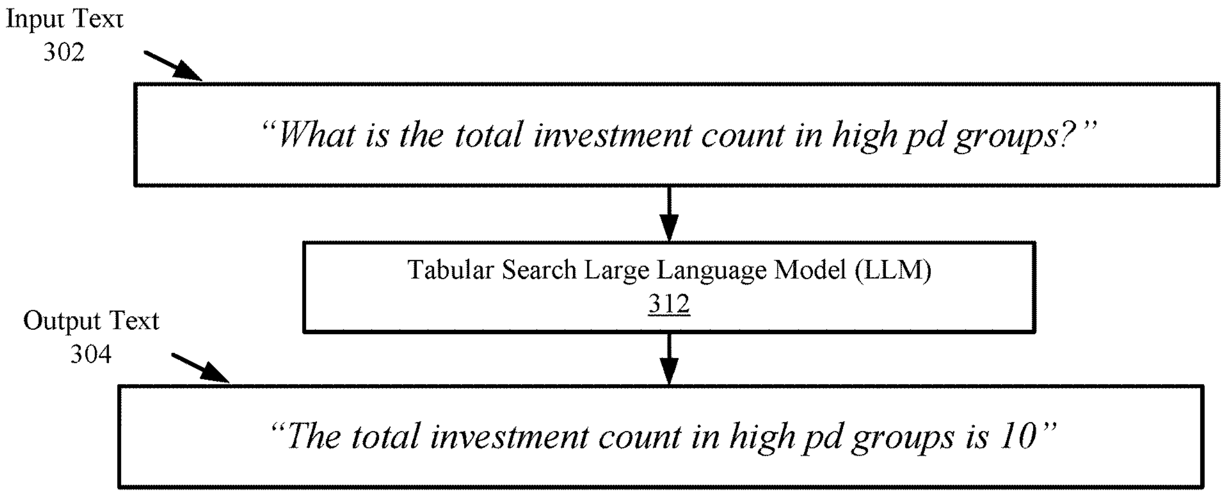
FIG. 3.2

Updated Tabular Dataset 310
| Business_unit_ID | final_cust_nbr | Level_flg | Pd_sum | Inv_cnt | ADL | Pd_cnt | Pd_grp |
|---|---|---|---|---|---|---|---|
| 11 | 3075479032 | Affinity | 290.08 | 5 | -5.5 | 3 | High |
| 11 | 2682095398 | Affinity | 21.99 | 6 | -4.833333 | 1 | Medium |
| 11 | 37442469 | Parent_party | 84.79 | 5 | -10.75 | 1 | Medium |
| 11 | 375312852 | Parent_party | 0 | 5 | 0 | 0 | Low |
| 11 | 2704002641 | Affinity | 338.13 | 5 | 36.4 | 5 | High |
| 11 | 2824050781 | Affinity | 2.64E+07 | 25409 | -123.9137 | 6 | Low |
| 11 | 2174424289 | Affinity | 2.29E+08 | 36005 | 0.961034 | 7749 | Medium |
| 2121 | 1702681894 | Affinity | 1.64E+08 | 979 | 18.158111 | 637 | High |
| 11 | 375279575 | Parent_party | 6.82E+06 | 88814 | -9.141663 | 1605 | Low |
| 5102 | 2612488687 | Affinity | 4.34E+07 | 229 | -9.681223 | 59 | Medium |
FIG. 3.3
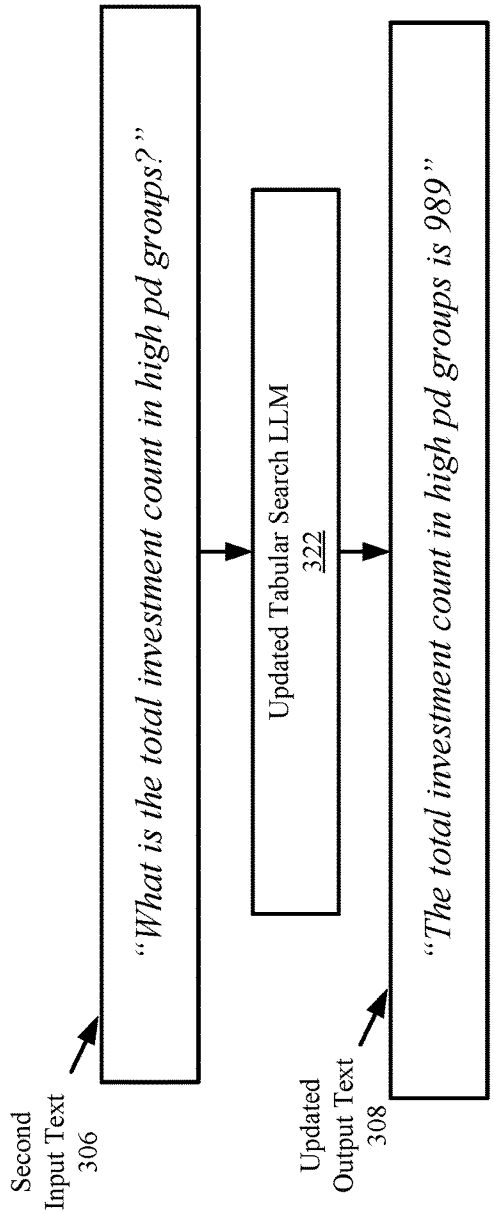
FIG. 3.4

MODEL EDITING OF A TABULAR SEARCH LARGE LANGUAGE MODEL USING DISAGREEMENT OVER OUT OF DISTRIBUTION SAMPLES VIA TRANSDUCTIVE LEARNING AND CONTEXTUAL BANDITS

BACKGROUND

Using trained models for tabular search provides ways for navigating structured datasets, making this a useful tool for completing data-driven tasks, analysis, and decision-making. When such structured datasets are modified to include new information, it may be cumbersome to perform a complete retraining of the trained models to incorporate the new information.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a flowchart of a method of updating a tabular search large language model in accordance with one or more embodiments of the invention.

FIG. 2.2 shows a flowchart of a method of applying a second fine-tuning operation of the tabular search LLM using training data in accordance with one or more embodiments of the invention.

FIGS. 3.1-3.4 show an example in accordance with one or more embodiments of the invention.

DETAILED DESCRIPTION

Figure 1:
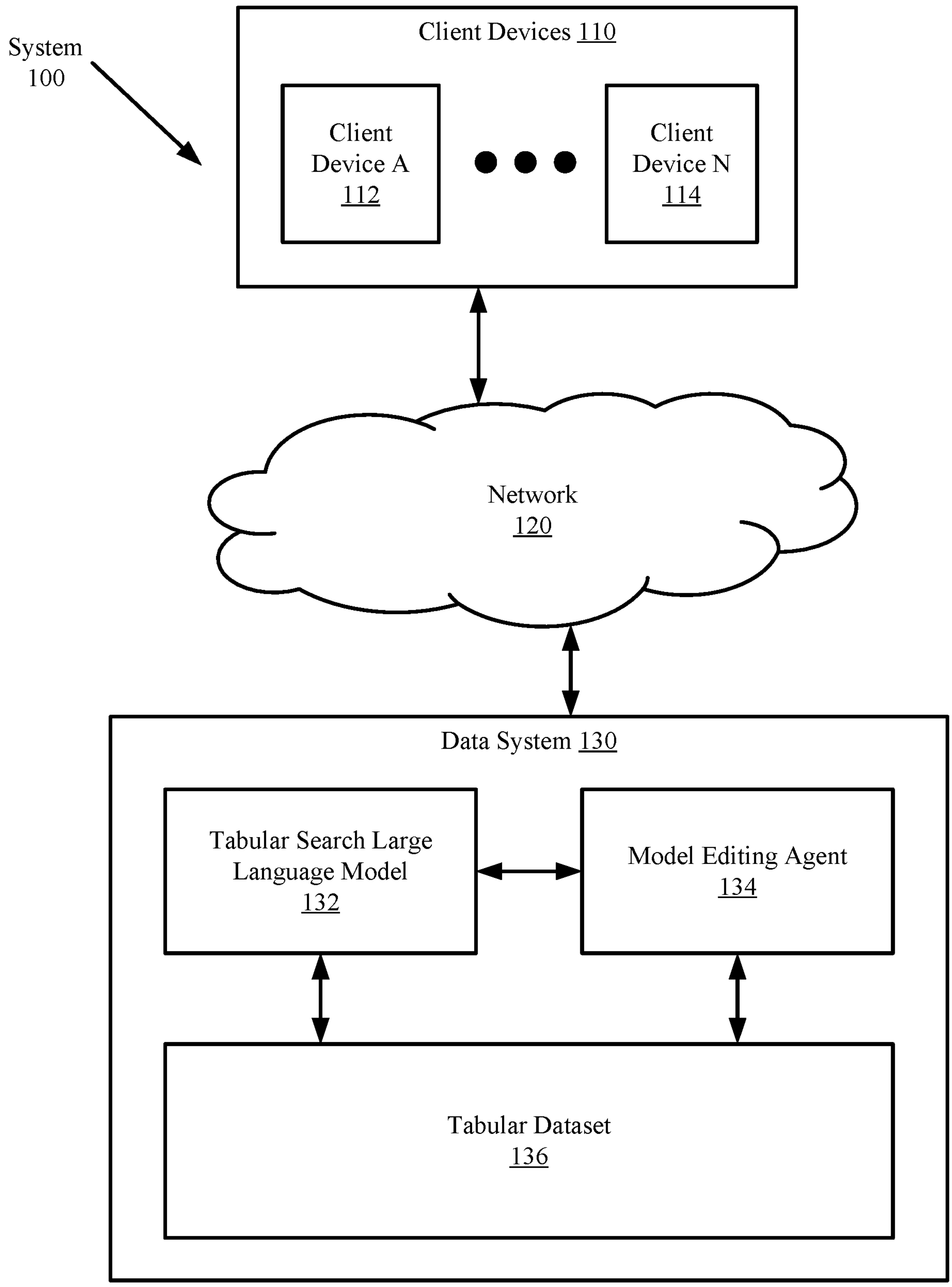
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or preceded) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments disclosed herein include methods and systems for managing the editing of a large language model (LLM) used for tabular search. Specifically, the LLM (also referred to as a "tabular search LLM") may be updated following the introduction of new information to a corresponding tabular dataset. The model editing may be performed by implementing at least the following pipelines: a data pre-processing of new data introduced to the tabular dataset, a training and fine-tuning over learned column embeddings, a training of unspecified predictions using transductive learning minimizing Kullback-Leibler (KL) divergence loss with updatable gradients, and optimizing gradient descent parameters as contextual bandits.

The result of implementing the aforementioned pipelines may include an updated tabular search LLM that is trained to service search queries for new data in the tabular dataset. The model editing using the aforementioned pipelines does not require a full re-training of the LLM. By performing the model editing without fully re-training the LLM, embodiments disclosed herein improve the efficiency of training LLMs corresponding to frequently-updated tabular datasets by maintaining low downtime during the model editing that is now available for full re-training. Further, the model editing performed in accordance with one or more embodiments of the invention reduces the risk of catastrophic forgetting or of artificial intelligence "hallucinations" caused by frequent full re-training. Embodiments disclosed herein include performing the model editing without reducing the operational performance of performing tabular search on previously-trained data.

The following describes various embodiments of the invention.

FIG. 1 shows a system in accordance with one or more embodiments of the invention. The system (100) includes any number of client devices (110), a network (120), and a data system (110) that. The system (101) may include additional, fewer, and/or different components without departing from scope of the invention. Each component may be operably connected to any of the other component via any combination of wired and/or wireless connections. Each component illustrated in FIG. 1 is discussed below.

In one or more embodiments of the invention, the data system (130) may provide computer-implemented services to users. The computer-implemented services may include access and preparation of tabular data of a tabular dataset (136). The tabular dataset (136) may include a table of a large number of rows and columns corresponding to data that may be accessed by users operating via the client devices (110).

Given the large size of the tabular dataset (136), it may be beneficial for the users to use a mechanism for tabular search to search and retrieve information corresponding to the tabular dataset (136). Embodiments disclosed herein include a tabular search large language model (LLM) that includes functionality for inputting natural language text associated with the tabular dataset (136) and outputting a response in a natural language corresponding to any queries included in the inputs. In one or more embodiments, the tabular search LLM (132) is a machine learning model that is trained using, for example, a multi-layer neural network algorithm. The tabular search LLM (132) may be trained using a first iteration of the tabular dataset (136). The tabular search LLM (132) may provide benefits to the tabular search by, for example, providing: flexibility in querying, access to data exploration and analysis, decision-making support, and scalability. The tabular search LLM (132) may help in extracting requested information in the large tabular dataset (136) from unstructured text and converting the text into a structured tabular format.

In one or more embodiments, as the tabular dataset (136) is frequently modified to introduce, remove, or otherwise modify data. For example, additional rows may be introduced on the tabular dataset (136) to include new entries to the table. Alternatively, or additionally, new columns may be introduced that include additional dimensions to existing entries. The frequent modification of the tabular dataset (136) may require the frequent editing of the tabular search LLM (132). To implement the model editing, the data system (130) may further include a model editing agent (134). The model editing agent (134) may include functionality to perform the model editing of the tabular search LLM (132) using mechanisms disclosed herein. The model editing performed by the model editing agent (134) may be performed using the methods of FIGS. 2.1-2.2. The model editing agent (134) may perform the model editing using other mechanisms without departing from the invention.

Figure 4:
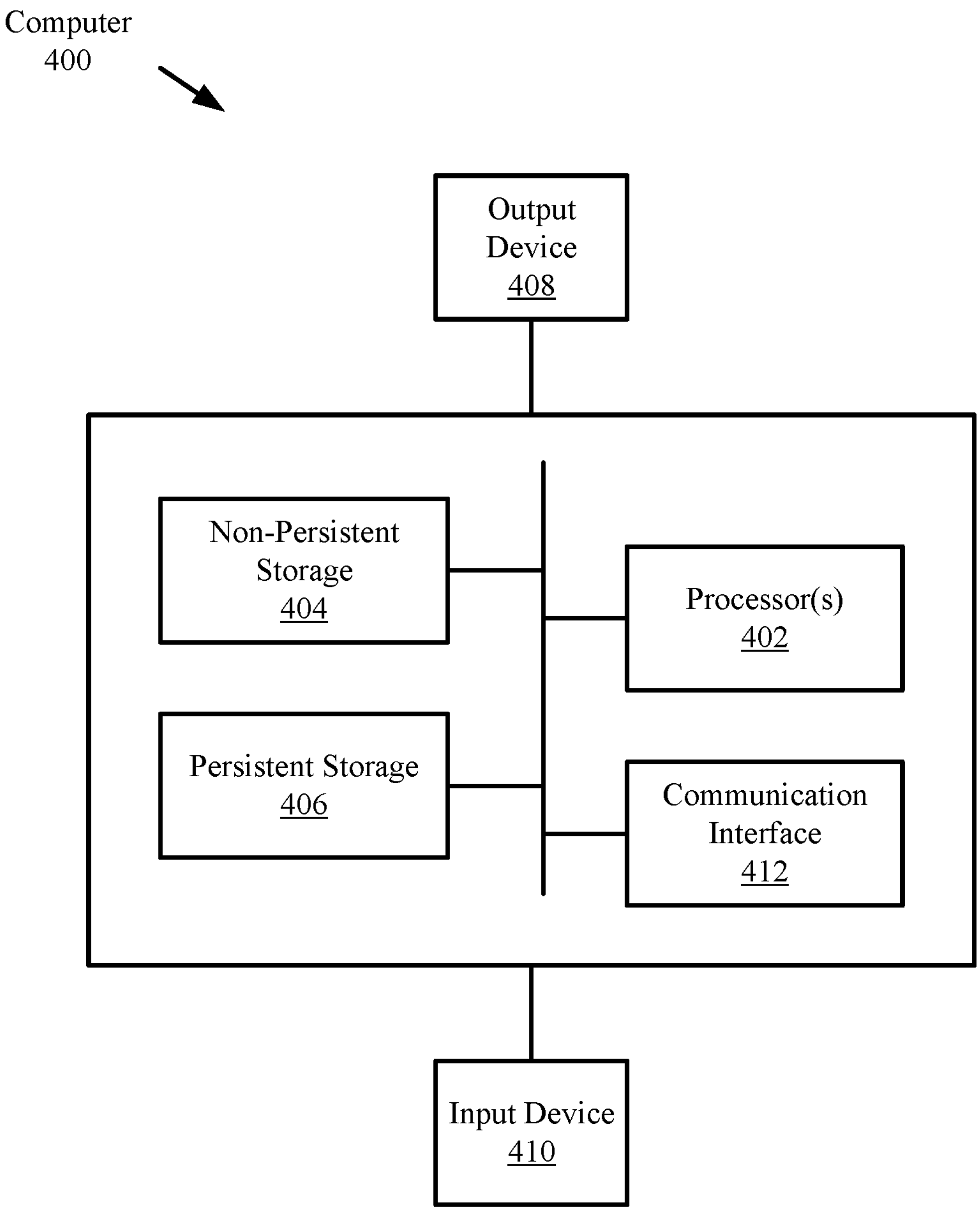
FIG. 4 shows a diagram of a computing device in accordance with one or more embodiments of the invention.

In one or more embodiments of the invention, the data system (130) (and/or any components illustrated within) may be implemented as a computing devices (e.g., 400, FIG. 4). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the data system (130) (and/or any components illustrated within) described throughout this present disclosure.

Alternatively, in one or more embodiments of the invention, the data system (130) (and/or any components illustrated within) may be implemented as logical devices. A logical device may utilize the computing resources of any number of computing devices to provide the functionality of the data system (130) (and/or any components illustrated within) described throughout this present disclosure.

In one or more embodiments of the invention, the above-mentioned system (100) components may operatively connect to one another through a network (120) (e.g., a local area network (LAN), a wide area network (WAN), a mobile network, a wireless LAN (WLAN), etc.). In one or more embodiments, the network (120) may be implemented using any combination of wired and/or wireless connections. The network (120) may encompass various interconnected, network-enabled subcomponents (not shown) (e.g., switches, routers, gateways, etc.) that may facilitate communications between the above-mentioned system (100) components.

In one or more embodiments of the invention, the network-enabled subcomponents may be capable of: (i) performing one or more communication schemes (e.g., Internet protocol communications, Ethernet communications, communications via any security protocols, etc.); (ii) being configured by the computing devices in the network (120); and (iii) limiting communication(s) on a granular level (e.g., on a per-port level, on a per-sending device level, etc.).

FIG. 2.1 shows a flowchart of a method of determining an inferencing workload placement based on latency minimization in accordance with one or more embodiments of the invention. The method shown in FIG. 2.1 may be performed by, for example, a workload placement service (e.g., 50, FIG. 1.1). Other components of the system in FIG. 1.1 may perform all, or a portion, of the method of FIG. 2.1 without departing from the invention.

While FIG. 2.1 is illustrated as a series of steps, any of the steps may be omitted, performed in a different order, additional steps may be included, and/or any or all of the steps may be performed in a parallel and/or partially overlapping manner without departing from the invention.

Turning to FIG. 2.1, in step 200, an update to a tabular dataset is detected. In one or more embodiments, the update includes introducing new data into the tabular dataset. The additional data may be, for example, any combination of new columns and new rows added to the tabular dataset. This may result in an updated tabular dataset.

In step 202, editing of a tabular search large language model (LLM) is initiated using at least a portion of the new data. In one or more embodiments, the editing is initiated based on a request issued by an administrator of the data system (e.g., 130, FIG. 1.1) (or by another entity) in response to detecting the update to the tabular dataset. Alternatively, a model editing agent (134, FIG. 1.1) may initiate the editing in response to detecting the update and making a determination that the editing exceeds a predefined threshold. Based on the determination, the model editing agent determines that the model editing of the tabular search LLM is warranted.

In step 204, a data pre-processing is performed on the portion of new data based on sentence conversion of rows and/or columns of the tabular dataset. In one or more embodiments, the data pre-processing includes generating sentences associated with the new data. For example, consider a scenario in which a table includes columns each corresponding to a variable. In this example, a new column is generated. The data pre-processing may include generating a sentence for the column corresponding to each row in the table. In this example, each sentence may include the following format: "The <column name> for <current row> is <value of cell>". The information labeled above between the < > brackets may be variables corresponding to the information of the column, row, and/or value of the cell. The aforementioned sentences generated using the data pre-processing may be used as output text and/or used for processing input text.

In one or more embodiments, the data-preprocessing further includes converting the names of columns into natural language text (e.g., English language, French language, Cantonese language, etc.). For example, consider a scenario in which a column of a table used for order-to-cash processing includes a column labeled "final_cust_nbr". The tabular search LLM may be trained to understand this string of text to convert this string of text to a variable labeling of "final customer number". Prior to generating the set of sentences, the data pre-processing may include performing these conversions and using the converted columns in the generated sentences.

In one or more embodiments, the data pre-processing further includes grouping predictions into sequences. In one or more embodiments, a sequence may refer to a grouping of modified input text and a modified output text. The grouping may be performed based on an expectation that the modified input may be applied to the tabular search LLM (or an updated version thereof) to generate the corresponding modified output. Each sequence may be generated by applying prediction models to the generated sentences to determine a prediction score for a pair of sentences. For each pair of sentences with a prediction score meeting a predefined criterion, the pair may be considered a sequence. The data pre-processing may include obtaining a set of sequences using the prediction models.

In step 206, a first fine-tuning operation is applied on the tabular search LLM using the set of sequences using quantized low rank optimization. In one or more embodiments, the first fine-tuning operation includes using textually encoded datasets (e.g., the generated sentences) and further using randomly-drawn permutations for each row to generate training data for the second fine-tuning operation. In one or more embodiments, the first fine-tuning operation includes tokenizing generated input text to obtain token sequences. Each of the tokens may be words or sub-word encodings, such as byte-pair encodings defined using a discrete and finite vocabulary. In common implementations of large language models, a probability of a token sequence may be calculated using auto-regressive models. The probabilities may be expressed as products of output probabilities conditioned on previously observed tokens. In this manner, effective large language models are capable predictors for follow-up tokens given an arbitrary-length preceding token sequence. The tabular search LLM may be trained to output probable distributions over possible next tokens in a token sequence from an input token sequence. The aforementioned capability may be used to generate additional sentences in a natural language. The generated sentences may be used for the training data. The generated sentences may be further referred to as modified inputs or modified outputs.

In step 208, a second fine-tuning operation of the tabular search LLM is applied using training data to obtain a set of final loss results and a set of updatable gradients. In one or more embodiments, the fine-tuning operation includes applying likelihood loss functions to the set of sequences (e.g., the pairs of modified inputs and modified outputs), using other training data such as, for example, existing inputs, existing outputs, generated outputs, random inputs, and updated outputs. In one or more embodiments, existing inputs refers to inputs previously used for the current iteration (e.g., before the model editing) of the LLM, the resulting output referred to as existing outputs. The generated outputs refers to outputs generated by applying modified inputs to the current iteration of the LLM. The random inputs refers to random input text that may not be probabilistically predicted and is used for the testing of multiple iterations of the LLM. The updated outputs may refer to applying the existing inputs to an updated iteration of the tabular search LLM.

In one or more embodiments, the second fine-tuning operation is performed using the method described in FIG. 2.2. Other methods may be performed to perform the second fine-tuning operation without departing from the invention.

In step 210, after obtaining final loss results, the tabular search LLM is updated based on the optimization of the final loss results to obtain an updated tabular search LLM. The updated tabular search LLM is updated such that it is equipped with the functionality to provide outputs to text using the updated tabular dataset and without impacting the parameters used to output text of the previous iteration of the tabular dataset. In this manner, the possibility of catastrophic forgetting or machine learning model hallucinations are significantly reduced compared to performing a full re-training of the LLM.

To further clarify the impact of updating the LLM using the aforementioned method, a non-limiting example may be found in FIGS. 3.1-3.4, described further below after the description of FIG. 2.2.

FIG. 2.2 shows a flowchart of a method of determining a training workload placement based on completion time in accordance with one or more embodiments of the invention. The method shown in FIG. 2.2 may be performed by, for example, the workload placement service (e.g., 50, FIG. 1.1). Other components of the system in FIG. 1.1 may perform all, or a portion, of the method of FIG. 2.2 without departing from the invention.

While FIG. 2.2 is illustrated as a series of steps, any of the steps may be omitted, performed in a different order, additional steps may be included, and/or any or all of the steps may be performed in a parallel and/or partially overlapping manner without departing from the invention.

Turning to FIG. 2.2, in step 220, modified inputs are applied to the tabular search LLM to obtain generated outputs. As discussed above, the modified inputs and the generated outputs may be a portion of the training data used for the remainder of the second fine-tuning operation.

In step 222, a likelihood loss function is applied on the generated outputs and modified inputs to obtain loss results each corresponding to a set of predictions. In one or more embodiments, a set of predictions as discussed in FIG. 2.1 may refer to a pairing of modified inputs and modified outputs. The generated outputs generated in step 220 are compared to the expected modified outputs of the corresponding prediction. The result of the comparison is a loss result. The loss results are generated for each prediction of the set of predictions.

In step 224, a multi-layer neural network algorithm is applied to the set of predictions to compute gradients associated with an iteration of an updated tabular search LLM. In one or more embodiments, the LLM may be a multi-layer neural network model. Each layer may be associated with any number of parameters, each corresponding to a set of weights. Using the loss results of step 222, the gradients are computed for each parameter in the multi-layer neural network algorithm. Gradients for each layer in the multi-layer neural network algorithm may be computed.

In step 226, a decomposition is performed on the computed gradients to obtain updated weights for an iteration of the updated tabular search LLM to optimize gradient descent parameters as contextual bandits. In one or more embodiments, the contextual bandits refer to a concept of reinforcement learning in which an action-reward pairing is further based on a state (e.g., the context) of a given decision. For example, to calculate a Q-function for a given contextual bandit, one may calculate an expected reward for a given decision (e.g., a given selection of weights for a layer in the multi-layer neural network algorithm) given a state and the decision.

In one or more embodiments described herein, the decomposition includes the model editing agent monitoring the state of the model (e.g., a given selection of weights for the LLM) as a set of the computed gradients are applied to the LLM and tracking the cost to the LLM as a difference between the cumulative reward over a time period and the sequence of actions taken by a most optimal policy (e.g., a selection of weights and/or at least a portion of computed gradients) over the same time period. For each policy, the cost is calculated such that the optimal policy is calculated as such policy with the minimized cost. In this manner, the selection of gradient parameters is optimized by approximating as contextual bandits with the aim to minimize the regret and maximize reward at each layer when the gradient is updated. This may ensure that the gradient parameters are chosen optimally at every step. The result of the optimization may include an updated tabular search LLM that includes the selected computed gradients.

In step 228, existing inputs are applied to the updated tabular search model to obtain updated outputs. In one or more embodiments, the existing inputs may include textual inputs that would have also been applied to the previous iteration of the tabular search LLM (i.e., the tabular search LLM before being updated) to obtain existing outputs. In this step, the existing inputs are applied to the updated LLM to obtain the updated outputs.

In step 230, the likelihood loss function is applied on the updated outputs and existing outputs to obtain a second set of loss results. In one or more embodiments, the likelihood loss function may be similar to the likelihood loss function applied to the In step 232, a Kullback-Leibler (KL) divergence associated with the second set of loss results and the result of random inputs applied to both the updated tabular search LLM and the previous iteration of tabular search LLM is determined.

In step 234, a set of final loss results are obtained using the KL divergence and the second set of loss results.

To further clarify embodiments of the invention described throughout this disclosure, a non-limiting example is provided in FIGS. 3.1-3.4.

EXAMPLE

Consider a scenario in which a tabular search LLM is trained to service tabular search queries for analyzing or otherwise accessing a given tabular dataset. The tabular dataset may be for an order-to-cash use case of tracking the processing of orders for a company.

Turning to FIG. 3.1, FIG. 3.1 shows a diagram of the tabular dataset (300). The tabular dataset (300) illustrated in FIG. 3.1 includes five entries each corresponding to a row. Each entry may be associated with values corresponding to a set of properties illustrated in columns. The columns are named using a string of text that includes words or abbreviations separated by underscore symbols. During training of a tabular search large language model (LLM), each column may be converted to a natural language sentence. For example, the sentence "The business unit identifier for the first entry is 11." may be generated for the first cell of the first column of the tabular dataset (300). In this example, the column labeled with the string of text of "Business_unit_ID" is interpreted in the English language as "business unit identifier" or "business unit ID". Similarly, the column labeled as "final_cust_nbr" may be interpreted in the English language as "final customer number". The tabular search LLM may be trained to perform such interpretations in the English language for these columns and all columns in the tabular dataset (300).

Turning to FIG. 3.2, the tabular search LLM (312) (also referred to simply as "the LLM") is used to perform a tabular search of data in the tabular dataset (300, FIG. 3.1). A user inputs the following text into the LLM (312): "What is the total investment count in high pd groups?" (302). The LLM (312) assigns functions and/or values to each word in the input text (302) based on the aforementioned training and applies additional layers of interpretations and processing to the input text (302) via the neural network algorithm to generate an output text (304). In this example, the LLM (312) interprets the word "total" to mean a sum function, and interprets "investment count" to refer to the "Inv_cnt" column of the tabular dataset (300). Further, the LLM (312) interprets "high pd groups" to refer to those entries (i.e., rows) in which the "Pd_grp" column is labeled as "High".

As such, the input text (302) is processed to interpret a query for summing the "Inv_cnt" values for those entries in which the "Pd_grp" is labeled as "High" and outputting the resulting summed value. In this example, the first and last entry in the tabular dataset (300) are labeled with the "High" Pd_grp value. The first entry and the last entry each has a "Inv_cnt" value of "5". Summing the two values obtains the result of "10". Given this summed value, the LLM (312) outputs a text as follows: "The total investment count in high pd groups is 10" (304).

Now consider a scenario in which additional data is introduced into the tabular dataset (300). In such scenarios in which the additional data included additional columns, each with a string of text used to label the corresponding column, the methods of FIGS. 2.1-2.2 may be used to perform model editing on the tabular search LLM (312) to obtain an updated model. In this example, a set of rows are introduced to the tabular dataset (300) to obtain an updated tabular dataset.

Turning to FIG. 3.3, FIG. 3.3 shows the updated tabular dataset (310). The updated tabular dataset (310) includes additional entries for a total of 10 rows of data. The updated tabular dataset (310) may result in updating the tabular search LLM. The updating may be performed in accordance with FIGS. 2.1-2.2.

FIG. 3.4 shows a diagram that includes an updated tabular search LLM (322). A second input text may include a second input text that includes the following text: "What is the total investment count in high pd groups?" (306). Similar to the first text of FIG. 3.2, the updated LLM (322) assigns functions and/or values to each word in the input text (302) based on the aforementioned training and applies additional layers of interpretations and processing to the input text (302) via the neural network algorithm to generate an output text (304). Also similar to the processing performed in FIG. 3.2, the second input text (306) is processed to interpret a query for summing the "Inv_cnt" values for those entries in which the "Pd_grp" is labeled as "High" and outputting the resulting summed value. In the updated tabular dataset (310)

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Embodiments of the invention may provide a system and method for editing a large language model (LLM) using fine tuning operations and using newly-introduced data. The editing of the LLM using the aforementioned operations may reduce the risk of negatively impacting the operation of the LLM that is introduced when performing any re-training on a machine learning model. For example, the risk of catastrophic forgetting, hallucinating, hyper-restriction of use-cases may impact the utility of the LLM after a complete re-training using new training data.

Embodiments disclosed herein emphasize the modification of gradient descent parameters of the LLM to limit the impact of the editing such that the LLM may continue to be useful for existing inputs (e.g., inputs applied prior to the editing) while enhancing the LLM to service modified inputs (e.g., inputs associated with the newly-introduced data).

Thus, embodiments of the invention may address the problem of limited computing resources in a distributed system. The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for updating a tabular search large language model (LLM), the method comprising:

performing data pre-processing on new data associated with a tabular dataset to obtain a set of sequences, wherein the data pre-processing comprises:

generating a set of sentences in a natural language each corresponding to a column of the tabular dataset and each in a predefined format, wherein the set of sentences are generated based on a pre-defined format;

converting the names of each column of the tabular dataset to the natural language using the tabular search LLM;

applying prediction models to the set of sentences to generate prediction scores each associated with a pair of the set of sentences; and determining the set of sequences based on the prediction scores, wherein determining the set of sequences is based on whether prediction scores of a corresponding pair of one of the set of sequences meet a predefined criterion, wherein each column of the tabular dataset is not written in the natural language;

applying a first fine-tuning operation on the tabular search LLM using the set of sequences, wherein the first fine-tuning operation comprises using a quantified low rank optimization of the set of sequences to obtain a set of sentence predictions, wherein the first fine-tuning operation further comprises tokenizing generated input text to obtain byte-pair encodings defined using discrete and finite vocabulary and generating follow-up tokens based on the byte-pair encodings to obtain training data comprising the byte-pair encodings and the follow-up tokens, wherein the training data further comprises the names of each columns and the sequences;

applying a second fine-tuning operation on the tabular search LLM using the training data to obtain a set of final loss results and a set of updatable gradients, wherein the training data comprises at least the set of sentence predictions, wherein the second fine-tuning operation comprises performing a decomposition on a set of computing gradients, wherein the decomposition comprises:

calculating a difference between a cumulative reward of the set of computing gradients and a sequence of actions taken by selecting a set of computing weights; and minimizing, using the difference, a regret value of the sequence of actions to obtain the set of updatable gradients;

applying an optimization function on the set of final loss results and the set of updatable gradients to obtain optimized gradient descent parameters, wherein an updated tabular search LLM is obtained using the optimized gradient descent parameters, and wherein the updated tabular search LLM is equipped to output information corresponding to the new data; and applying the updated tabular search LLM to a new input associated with the new data to produce a new output, wherein the new output would not be produced if the tabular search LLM is applied to the new input, wherein the updated tabular search LLM is not a full re-training of the tabular search LLM.

2. The method of claim 1, wherein the new data comprises adding, to the tabular dataset, at least one of: a new column of data and a new row of data.

3. The method of claim 1, wherein the second fine-tuning operation comprises:

applying a set of modified inputs to the tabular search LLM to obtain a set of generated outputs, wherein the set of sentence predictions comprise at least the set of modified inputs;

computing the set of updatable gradients using the set of generated outputs, the set of modified inputs, and a set of modified outputs using a likelihood loss function, wherein the set of sentence predictions comprises the set of modified inputs and the set of modified outputs; and computing the set of final loss results using the set of updatable gradients and a set of random inputs, wherein the training data further comprises the set of generated outputs and the set of random inputs.

4. The method of claim 3, wherein the set of final loss results are computed by determining a Kullback-Leibler (KL) divergence associated with a set of first loss results and a result of applying the set of random inputs to both the tabular search LLM and the updated tabular search LLM.

5. The method of claim 4, wherein the set of first loss results are based on the likelihood loss function applied to a set of updated outputs and a set of existing outputs, wherein the updated outputs are based on applying the updated tabular search LLM to a set of previous inputs, and wherein the set of existing outputs are based on applying the tabular search LLM to a set of previous inputs.

6. The method of claim 5, wherein the set of existing inputs comprises at least a natural language question asking for information corresponding to the tabular dataset, and wherein the set of existing outputs comprises at least a natural language response to the natural language sentence.

7. A non-transitory computer readable medium comprising computer readable program code, which when executed by a computer processor enables the computer processor to perform a method for updating a tabular search large language model (LLM), the method comprising:

performing data pre-processing on new data associated with a tabular dataset to obtain a set of sequences, wherein the data pre-processing comprises:

generating a set of sentences in a natural language each corresponding to a column of the tabular dataset and each in a predefined format, wherein the set of sentences are generated based on a pre-defined format;

converting the names of each column of the tabular dataset to the natural language using the tabular search LLM; and applying prediction models to the set of sentences to generate prediction scores each associated with a pair of the set of sentences; and determining the set of sequences based on the prediction scores, wherein determining the set of sequences is based on whether prediction scores of a corresponding pair of one of the set of sequences meet a predefined criterion, wherein each column of the tabular dataset is not written in the natural language;

applying a first fine-tuning operation on the tabular search LLM using the set of sequences, wherein the first fine-tuning operation comprises using a quantified low rank optimization of the set of sequences to obtain a set of sentence predictions, wherein the first fine-tuning operation further comprises tokenizing generated input text to obtain byte-pair encodings defined using discrete and finite vocabulary and generating follow-up tokens based on the byte-pair encodings to obtain training data comprising the byte-pair encodings and the follow-up tokens, wherein the training data further comprises the names of each columns and the sequences;

applying a second fine-tuning operation on the tabular search LLM using the training data to obtain a set of final loss results and a set of updatable gradients, wherein the training data comprises at least the set of sentence predictions, wherein the second fine-tuning operation comprises performing a decomposition on a set of computing gradients, wherein the decomposition comprises:

calculating a difference between a cumulative reward of the set of computing gradients and a sequence of actions taken by selecting a set of computing weights; and minimizing, using the difference, a regret value of the sequence of actions to obtain the set of updatable gradients;

applying an optimization function on the set of final loss results and the set of updatable gradients to obtain optimized gradient descent parameters, wherein an updated tabular search LLM is obtained using the optimized gradient descent parameters, wherein the updated tabular search LLM is equipped to output information corresponding to the new data; and applying the updated tabular search LLM to a new input associated with the new data to produce a new output, wherein the new output would not be produced if the tabular search LLM is applied to the new input, wherein the updated tabular search LLM is not a full re-training of the tabular search LLM.

8. The non-transitory computer readable medium of claim 7, wherein the new data comprises adding, to the tabular dataset, at least one of: a new column of data and a new row of data.

9. The non-transitory computer readable medium of claim 7, wherein the second fine-tuning operation comprises:

applying a set of modified inputs to the tabular search LLM to obtain a set of generated outputs, wherein the set of sentence predictions comprise at least the set of modified inputs;

computing the set of updatable gradients using the set of generated outputs, the set of modified inputs, and a set of modified outputs using a likelihood loss function, wherein the set of sentence predictions comprises the set of modified inputs and the set of modified outputs; and computing the set of final loss results using the set of updatable gradients and a set of random inputs, wherein the training data further comprises the set of generated outputs and the set of random inputs.

10. The non-transitory computer readable medium of claim 9, wherein the set of final loss results are computed by determining a Kullback-Leibler (KL) divergence associated with a set of first loss results and a result of applying the set of random inputs to both the tabular search LLM and the updated tabular search LLM.

11. The non-transitory computer readable medium of claim 10, wherein the set of first loss results are based on the likelihood loss function applied to a set of updated outputs and a set of existing outputs, wherein the set of updated outputs are based on applying the updated tabular search LLM to a set of previous inputs, and wherein the set of existing outputs are based on applying the tabular search LLM to a set of existing inputs.

12. The non-transitory computer readable medium of claim 11, wherein the set of existing inputs comprises at least a natural language question asking for information corresponding to the tabular dataset, and wherein the set of existing outputs comprises at least a natural language response to the natural language response.

13. A system, comprising:

a processor; and memory including instructions, which when executed by the processor, perform a method comprising:

performing data pre-processing on new data associated with a tabular dataset to obtain a set of sequences, wherein the data pre-processing comprises:

generating a set of sentences in a natural language each corresponding to a column of the tabular dataset and each in a predefined format, wherein the set of sentences are generated based on a pre-defined format;

converting the names of each column of the tabular dataset to the natural language using the tabular search LLM; and applying prediction models to the set of sentences to generate prediction scores each associated with a pair of the set of sentences; and determining the set of sequences based on the prediction scores, wherein determining the set of sequences is based on whether prediction scores of a corresponding pair of one of the set of sequences meet a predefined criterion, wherein each column of the tabular dataset is not written in the natural language;

applying a first fine-tuning operation on the tabular search LLM using the set of sequences, wherein the first fine-tuning operation comprises using a quantified low rank optimization of the set of sequences to obtain a set of sentence predictions, wherein the first fine-tuning operation further comprises tokenizing generated input text to obtain byte-pair encodings defined using discrete and finite vocabulary and generating follow-up tokens based on the byte-pair encodings to obtain training data comprising the byte-pair encodings and the follow-up tokens, wherein the training data further comprises the names of each columns and the sequences;

applying a second fine-tuning operation on the tabular search LLM using training data to obtain a set of final loss results and a set of updatable gradients, wherein the training data comprises at least the set of sentence predictions, wherein the second fine-tuning operation comprises performing a decomposition on a set of computing gradients, wherein the decomposition comprises:

calculating a difference between a cumulative reward of the set of computing gradients and a sequence of actions taken by selecting a set of computing weights; and minimizing, using the difference, a regret value of the sequence of actions to obtain the set of updatable gradients;

applying an optimization function on the set of final loss results and the set of updatable gradients to obtain optimized gradient descent parameters, wherein an updated tabular search LLM is obtained using the optimized gradient descent parameters, wherein the updated tabular search LLM is equipped to output information corresponding to the new data; and applying the updated tabular search LLM to a new input associated with the new data to produce a new output, wherein the new output would not be produced if the tabular search LLM is applied to the new input, wherein the updated tabular search LLM is not a full re-training of the tabular search LLM.

14. The system of claim 13, wherein the second fine-tuning operation comprises:

applying a set of modified inputs to the tabular search LLM to obtain a set of generated outputs, wherein the set of sentence predictions comprise at least the set of modified inputs;

computing the set of updatable gradients using the set of generated outputs, the set of modified inputs, and a set of modified outputs using a likelihood loss function, wherein the set of sentence predictions comprises the set of modified inputs and the set of modified outputs; and computing the set of final loss results using the set of updatable gradients and a set of random inputs, wherein the training data further comprises the set of generated outputs and the set of random inputs.

15. The system of claim 14, wherein the set of final loss results are computed by determining a Kullback-Leibler (KL) divergence associated with a set of first loss results and a result of applying the set of random inputs to both the tabular search LLM and the updated tabular search LLM.

16. The system of claim 15, wherein the set of first loss results are based on the likelihood loss function applied to a set of updated outputs and a set of existing outputs, wherein the set of updated outputs are based on applying the updated tabular search LLM to a set of previous inputs, wherein the set of existing outputs are based on applying the tabular search LLM to a set of existing inputs, and wherein the set of existing inputs comprises at least a natural language question asking for information corresponding to the tabular dataset, and wherein the set of existing outputs comprises at least a natural language response to the natural language question.

* * * * *